Feb. 13, 1962 R. K. POTTLE ETAL 3,021,047
CONTAINER
Filed April 18, 1958 2 Sheets-Sheet 1
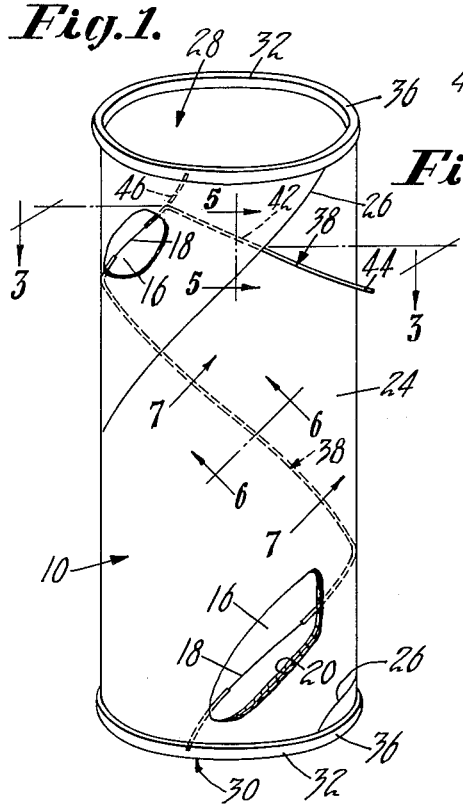
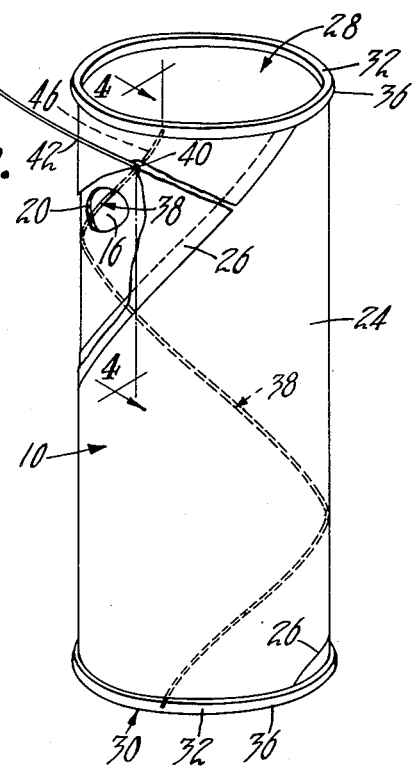
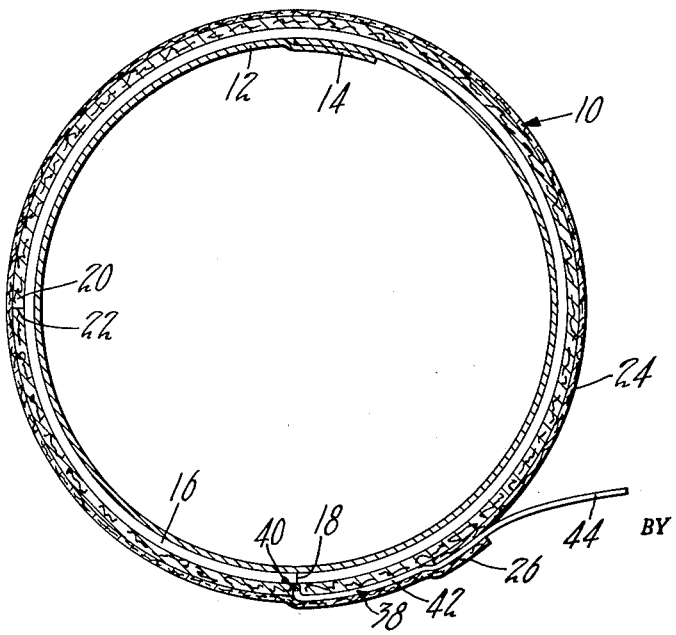
INVENTORS
RALPH K. POTTLE
WILLIAM B. ELAM
BY
ATTORNEY

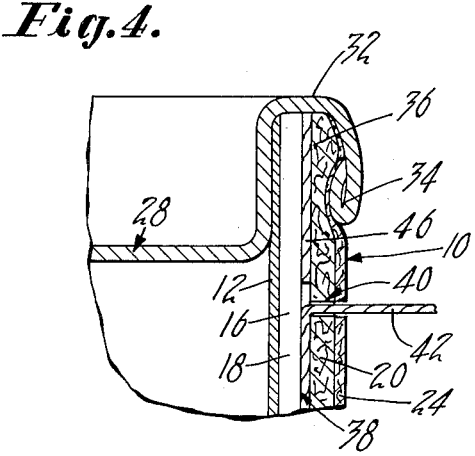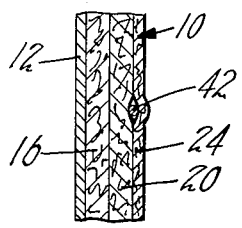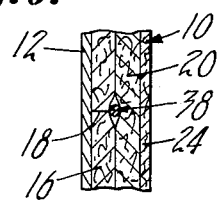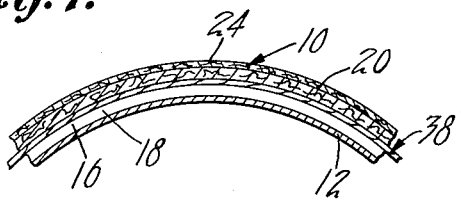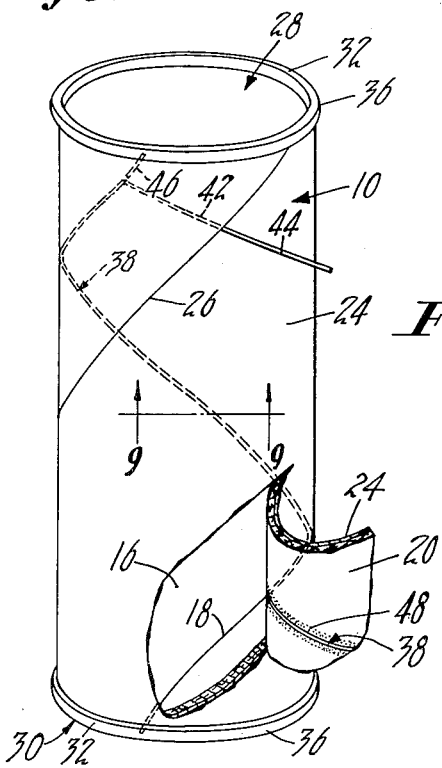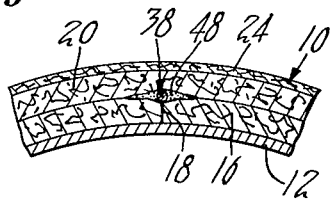
INVENTORS
RALPH K. POTTLE
WILLIAM B. ELAM

United States Patent Office 3,021,047
Patented Feb. 13, 1962

3,021,047
CONTAINER
Ralph K. Pottle, Georgetown, Conn., and William B. Elam, Jersey City, N.J., assignors to American Can Company, New York, N.Y., a corporation of New Jersey
Filed Apr. 18, 1958, Ser. No. 729,366
14 Claims. (Cl. 229—51)

The present invention relates to spirally wound, fibre tear string containers, and more particularly to such a container particularly adapted for use for holding unbaked biscuit dough cakes or similar products.

In the commercial packaging and handling of raw biscuit dough, the container must meet certain specifications if it is to successfully hold the product. For one thing the container must be strong, since considerable internal pressures are developed by the leavening action of the baking powder in the dough during the proofing and handling periods. For another, the external surfaces of the container must be moisture and water proof since the packages are subjected to refrigeration which frequently causes a heavy condensation of atmospheric moisture on such surfaces which would soften and weaken the inner body plies if it were permitted to reach them. Similarly, the internal surfaces of the container must be moisture or water proof, since the dough itself contains a considerable amount of water which must be kept from reaching the inner body plies. Also, the container must permit of easy opening without deformation of the contents, in order to make it attractive to the ultimate consumer.

Containers of various types and constructions have been and are now being used to package biscuit dough with varying degrees of success. Some are not strong enough to consistently hold the product, others are so strong that they are difficult to open. Some require that the biscuits be put in a separate liner bag in order to permit their removal, which is expensive, while others, although provided with a waterproof external label, require that cuts be made in it in order to provide an opening feature, thus making the container susceptible to the action of external moisture. The container of the instant invention, on the other hand, has none of these disadvantages, and is believed to be the most practical container for biscuit dough as yet developed.

An object of the invention, therefore, is the provision of a spirally wound container for biscuit dough which can be easily opened by means of a tear string inserted between the body plies during the spiral winding operation.

Another object is the provision of a container wherein the spiralled tear string is positioned so that when it is pulled to tear through certain body plies, the body wall is so weakened that when the ends of the container are thereafter twisted in opposite directions, the body can be laid out flat, thus completely releasing the plastic contents without substantial deformation.

Still another object is to provide a container having a body comprising at least two comparatively heavy spirally wound inner body plies, and having a tear string disposed between the said plies and positioned over the spiral butt joint or other weakened spiral line in the inner ply so that when the string is pulled, the spiral line of tear formed in the outer body ply is disposed in registration with the said butt joint to create a single line of opening which extends through the strength-imparting portion of the body wall and permits of opening the container.

Yet another object is the provision of such a container having at least two heavy body plies and an external label ply, wherein the spiral tear string is brought through a hole formed in the outer heavy body ply and then extended substantially circumferentially of the body beneath the label ply and passed between the label overlap to the outside of the container where it is visible to the consumer and can be grasped and pulled to open the container, thus avoiding the necessity of forming holes or cuts in the label ply to provide access to the string.

Another object is the provision of a tear string container wherein the length of the free, visible end of the tear string may be kept to a minimum to prevent inadvertent, premature tearing of the container wall.

Numerous other objects and advantages of the invention will be apparent as it is better understood from the following description, which, taken in connection with the accompanying drawings, discloses a preferred embodiment thereof.

Referring to the drawings:

FIGURE 1 is a perspective view of a container constructed according to the principles of the present invention, parts being broken away;

FIG. 2 is a view similar to FIG. 1 showing the initial stage of the opening action of the tear string, parts being broken away;

FIG. 3 is an enlarged sectional view taken substantially along the line 3—3 of FIG. 1;

FIG. 4 is an enlarged sectional view taken substantially along the line 4—4 of FIG. 2;

FIGS. 5, 6 and 7 are enlarged sectional views taken substantially along the lines 5—5, 6—6, and 7—7, respectively, of FIG. 1;

FIG. 8 is a perspective view similar to FIG. 1 but showing a modified form of the invention, a portion of the container body being broken out and rolled back to disclose details of its inner construction; and FIG. 9 is an enlarged sectional view taken substantially along the line 9—9 of FIG. 8.

As a preferred or exemplary embodiment of the invention the drawings illustrate a container having a body 10 formed of four plies helically or spirally wound in the same direction and at the same angle and glued together to form a strong moisture and water proof body. These plies, reading from the inside out, comprise first, an inner liner 12, preferably composed of aluminum foil prelaminated to a paper backing in the usual manner, and having its spiralled edges overlapped to form a lap joint 14 to prevent the leakage therethrough of gases, grease or moisture. The liner 12 is glued to a first main body ply 16, preferably formed of comparatively heavy stock such as chipboard or kraft, and having its edges butted to form a butt joint 18 circumferentially offset from the lap joint 14 of the liner. The first main body ply 16 is in turn glued to a second main body ply 20, also preferably formed of comparatively heavy stock such as chipboard or kraft, and having a butt joint 22 which is circumferentially offset from the butt joint 18 of the first main body ply. The second main body ply in turn is adhesively secured to an outer label ply 24, the spiral edges of which are lapped to form a lap joint 26 which is of sufficient width to prevent the penetration of any water which might condense on the label during the proofing, refrigerating or subsequent handling of the filled container. This lap joint 26 is circumferentially offset from the butt joint 18, as will be hereinafter more fully explained. The label 24 is preferably made of aluminum foil, also prelaminated to a paper backing in the usual manner. The desired label design may be printed directly on the external foil surface of the label 24.

The ends of the container are preferably closed by means of upper and lower metal end members 28, 30, formed with U-shaped peripheral channels 32 (see FIG. 4) which receive the ends of the body. The outer flanges of the channels 32 are provided with hemmed edges 34 and are clamped against the body ends to compress the same and form tight end seams 36 which are resistant to the axial pressure developed within the container by the biscuit dough contained therein. As seen in FIG. 4, the liner ply 12 and the label ply 24 extend fully into the end seam 36. Thus, the raw cut edges of the first and second main body plies 16, 20 are isolated from and protected against any moisture which might be present either internally or externally of the container. Thus, a strong rigid container is provided which is unaffected by the moisture normally encountered during commercial handling and storage conditions.

It should be noted that the strength of the container would be greatly lessened if moisture in any appreciable amount were permitted to reach the main body plies 16, 20 since they would rapidly soften and weaken, with the result that the container would be unable to withstand the considerable internal pressures which are developed.

In order to provide a means for opening the container without the necessity of using tools, a tear string 38 is interposed between the body plies 16, 20 in superposed position directly overlying the spiral butt joint 18 of the first body ply 16 and underlying an unbroken, imperforate portion of the second body ply 20. In this position, the string follows the helix angle of the container plies and thus spirals around the body substantially its full length. At the bottom end of the container, the string preferably extends into the bottom seam 36 and is thus anchored against longitudinal movement. The string extends upwardly in one, unbroken piece (although shown broken away in two places in FIG. 1 to clearly illustrate its position overlying the butt joint 18) to a point adjacent the upper end seam 36 of the container, and then passes thru a small hole or perforation 40 formed in the second body ply 20. From this point the string extends in a lateral direction, generally circumferentially of the container, towards the label joint 26, a portion 42 of the string being disposed between the second body ply 20 and the label 24 from the perforation 40 to the label lap joint 26. The string, after passing between the lapped edges of the label, projects externally therefrom, terminating in a free end 44 which projects or dangles from the side wall of the container and is visible to the ultimate consumer.

As seen in FIG. 4, a short separate section 46 of string extends upwardly into the upper end seam 36 from a point adjacent the perforation 40. This section 46 is merely incidental to the manufacture of the container, and serves no function in opening the container. The disclosed manner in which this piece of string 46 is anchored in the upper end seam 36 is, however, identical to that in which the lower end of the tear string 38 is anchored in the bottom end seam.

When the consumer desires to open the container, he or she grasps the free, projecting end 44 of the string 38 and pulls radially outwardly on it, thus tearing through the label from its lap joint 26 to a point immediately above the perforation 40 in the second body ply 20, as seen in FIG. 2. From this point on, continued pulling pressure on the string results in the creation of a line of tear through the second body ply 20 as well as in the label 24. This line of tear spirals around the body from the perforation 40 to the bottom seam 36 and is in alignment with the butt joint 18 of the first body ply 16, thus leaving only the comparatively weak liner 12 unseparated along this spiral line.

If the pressure within the container is sufficiently great, this liner will rupture, thus resulting in complete severance of the body wall. Thereafter, the consumer need only grasp both ends of the container and twist in opposite directions, thus opening up the body wall along the spiral line of tear and permitting it to be laid out flatly and exposing the dough biscuits in substantially undeformed condition. If the internal pressure does not rupture the liner, the twisting action alone is usually sufficient to do it. If not, a localized inward pressure adjacent the line of tear will initiate the rupture, and permit the twisting action to be effected without difficulty.

As seen in the drawings, the label lap joint 26 is circumferentially offset from the tear string 38 overlying the butt joint 18. The amount of offset is not critical, but should be at least sufficient to space the perforation 40 a sufficient distance from the lap joint 26 to prevent the possibility of moisture wicking along the tear string 38 and reaching the perforation 40, since the area adjacent this perforation 40 is the weakest and most vulnerable part of the container body. The offset also serves another function, as will now be explained.

In a tear string container, it is undesirable to have the free, dangling end 44 of the tear string of too great a length. For one thing, too long an end is unsightly. For another, the longer it is, the greater is the danger of its being accidentally caught in some object and inadvertently pulled to prematurely tear through the container wall. To obviate this, the offset distance between the lap joint 26 and the perforation 40 is preferably made sufficiently great so that the length of the portion 42 of the string beneath the label is substantial. Since the initial tearing action required to open the container, namely, the tearing through of the thin, easily tearable label 24 from its lap joint 26 to the perforation 40 requires only small force, the consumer's grip on the tear string need not be very great, and consequently the free exposed end 44 of the tear string need only be long enough to enable it to be grasped between the thumb and forefinger. However, the final tearing action from the perforation 40 spirally toward the bottom end seam 36 must be made through both the second body ply 20 and the label 24, and requires considerably more force, and consequently a better grip on the cord. However, by the time the tearing action reaches the perforation 40, the length of string available for gripping has increased considerably in length, because of the fact that the portion 42 of the string initially covered by the label has now been exposed, and this increased length enables the consumer to obtain the firm grip necessary to initiate the final spiral tearing action through the body ply 20 and the label 24. This is clearly brought out in FIG. 2. Thus, the distance which the label lap joint 26 is circumferentially offset from the perforation 40, is an important factor in determining the length of string available to the ultimate consumer for gripping at the initiation of the final spiral tearing action. It is obvious that this length can be increased, without increasing the length of the exposed free end 44, by increasing the offset distance to thereby increase the length of the string portion 42. Preferably, the combined length of string sections 42, 44 should be sufficient to permit the consumer to wrap it securely around one of his or her fingers.

In the container construction of FIGS. 1–7, the plies 16, 20 are adhesively secured together over their entire mutually contacting surfaces. Normally this is effected by the application of glue over the entire inner surface of ply 20 immediately prior to the spiral winding of the container body 10. As a result, the plies immediately adjacent the string 38 are securely glued to each other, and if the string 38 should inadvertently be slightly out of register with the butt joint 18, due to inaccuracies which are sometimes encountered by the spiral winder used to manufacture the container, there will remain a glued section of the plies 16, 20 between the butt joint 18 and the spiral line of tear created by the string during the opening operation, and the desired opening of the body will be impeded thereby.

To prevent this, the modified construction disclosed in FIGS. 8 and 9 may be utilized. In this modified construction the tear string 38 is disposed centrally of a spiral stripe 48 of a material, such as paraffin wax, which is repellant to the adhesive used to secure the plies 16, 20 to each other. As a result, these plies are not secured together for the width of the stripe 48. Consequently, if the string 38 should inadvertently be slightly out of register with the butt joint 18, the tearing through of the second body ply 20 and the label 24 will nevertheless result in the opening of the container, since there will be no glued section between the butt joint 18 and the line of tear produced by the string in the outer plies 20, 24. The same result will be had if the glue securing the plies 16, 20 together is eliminated for a short distance on either side of the string 38.

As will be readily seen, the principles of the invention are not limited to the constructions disclosed in the drawings, and various other modifications may be made in the container without departing from those principles. As an example, it is not essential that the line of opening in the inner body ply 16 disposed beneath the string 38 be the butt joint 18. If desired, this butt joint 18 could be offset from the string 38 and the line of opening could be a separate weakening line, such as a cut line, score line, or line of perforation, formed in the first body ply 16 and disposed directly beneath the string 38. Another modification would be to eliminate the inner foil liner ply 12 and substitute therefore a lining or coating comprising wax, plastic, or other moisture-proof material. It will also be understood that the relative thickness and strength of the various body plies can be adjusted to secure the desired strength and opening characteristics. Furthermore, the term "tear string," as used herein, includes any tearing or ripping element such as a cord, wire, narrow tape, etc., which would function in substantially the same manner as string 38.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A tear string container comprising a fibre body composed of an inner and an outer helically wound body ply, the helical edges of each of said body plies being abutted to form a helical butt joint in each of said body plies, the butt joint in said inner body ply being offset from the butt joint in said outer body ply, a perforation formed in said outer body ply adjacent extending radially therethrough at a point spaced axially from an end thereof and substantially aligned with a point on the butt joint of said inner body ply, a liner covering the inner surface of said inner body ply, a helically wound label covering the outer surface of said outer body ply, the helical edges of said label being overlapped to form a lap joint offset from said perforation, a pair of metal end members clampingly secured to the ends of said fibre body, and a tear string interposed between said body plies in registration with the helical butt joint of said inner body ply, said tear string being secured against movement from said position along said helical butt joint by the pressure applied thereto by said plies and further secured at one end by one of said metal end members and extending helically around said body from said latter end member to said perforation and passing through said perforation and thence extending substantially circumferentially of said body between said outer body ply and said label and passing through said label lap joint and terminating in a free end disposed exteriorly of said label, whereby when said tear string is pulled the label alone is torn from its lap joint to said perforation and thereafter a helical line of tear is created in said outer body ply and said label in registration with said inner ply butt joint.

2. A tear open container having a tubular body comprising an inner helically wound ply having its edges abutting along a helical line of opening, a frangible inner lining covering the inner surface of said ply and said helical line of opening, an outer helically wound ply on said inner ply with its helical joint offset from said line of opening of the inner ply, said outer ply having a perforation extending radially therethrough at a point spaced axially from an end thereof and in alignment with said line of separation of the inner ply, and a tear string interposed between said inner and outer plies close and substantially parallel to said line of opening of the inner ply, said string having a portion thereof extending through said perforation and terminating in a free end disposed exteriorly of said outer layer whereby, when said tear string is pulled, a helical line is torn through said outer ply substantially in registration with said line of opening in the inner ply leaving only said frangible inner lining intact until broken readily by relatively light pressure applied thereto for releasing the contents of the container.

3. The container of claim 2 wherein there is provided a helically wound label covering the outer surface of said outer ply with the helical edges of said label overlapped to form a helically lapped joint offset from said perforation, and said tear string extends from said perforation substantially circumferentially of the body between said outer ply and said label, passes through said lapped joint of the label and terminates in a free end disposed exteriorly of said label whereby, when said tear string is pulled, the label alone is first torn along a line through its lapped joint to said perforation and thereafter a helical line is torn through the outer body ply substantially in registration with said line of opening in the inner ply leaving only said frangible inner lining intact until broken readily by relatively light pressure applied thereto.

4. A tear string container having a tubular body comprising a spirally wound inner ply and an outer ply, a pair of end members secured to the opposite ends of said body to close the same, said inner ply having formed in it a line of opening extending helically around it from one of said end members to the other, said outer ply having an opening extending radially therethrough at a point spaced axially from an end thereof and substantially aligned with a point on said line of opening adjacent one of said end members, and a tear string interposed and held between said body plies substantially overlying and extending along said line of opening, one end of said string projecting through said opening in the outer ply and terminating in a free end positioned exteriorly of the container, whereby when said tear string is pulled a helical line is torn in said outer ply between said end members and in registration with said line of opening in said inner ply, thereby permitting further opening of the container along said line of opening by twisting the ends of the container in appropriate opposite directions.

5. The container of claim 4 wherein the line of opening in the inner body ply is a butt joint between lateral edges thereof.

6. The container of claim 4 wherein a label is disposed exteriorly of said outer body ply, and wherein said tear string is extended under a portion of said label to an edge thereof from which its free end extends exteriorly of said label.

7. The container of claim 4 wherein said inner and outer body plies are glued to each other, but wherein the portions of said plies closely adjacent said tear string and said line of opening in the inner ply are unglued.

8. The container of claim 7 wherein said tear string is disposed centrally of a stripe of glue repellant material to prevent adhesion between said body plies adjacent said tear string and said line of opening in the inner ply.

9. A tear string container having a tubular body comprising an inner ply and an outer ply, said inner ply being provided with a helical line of opening extending from one end of said body to the opposite end thereof, said outer ply having a perforation extending radially therethrough at a point spaced axially from said opposite end of the body and substantially in alignment with a point on said line of opening in said inner ply, a tear string interposed and held between said plies and substantially overlying and extending along said line of opening from said one end of said body to said perforation and thence passing through said perforation to the outside of said outer ply and terminating in a free end, whereby when said tear string is pulled a helical line is torn in said outer ply in registration with said line of opening in said inner ply.

10. A tear string container having a fibre body comprising an inner ply, an outer ply, and an inner frangible liner on said inner ply, said inner ply being provided with a helical line of opening extending from one end of said body to the opposite end thereof, said outer ply having a perforation extending radially therethrough at a predetermined distance from said opposite end of the body and substantially in alignment with a point on said line of opening in said inner ply, a label wrapped around said outer ply and having its edges overlapped to form a lap joint, said lap joint being offset from said perforation, and a tear string interposed and held between said inner and outer body plies and disposed close to said line of opening and extending helically along said body substantially parallel to said line to and through said perforation to the outside of said outer body ply and thence extending between said outer body ply and said label and through said label lap joint and terminating in a free end positioned exteriorly of said label, whereby when said tear string is pulled the label alone is torn from its lap joint to said perforation and thereafter a helical line is torn in said outer ply and said label in registration with said line of opening in said inner ply.

11. The container of claim 10 wherein said inner and outer body plies are glued together, but wherein the portions of said plies closely adjacent said tear string and line of opening in the inner ply are left unglued.

12. The container of claim 11 wherein said tear string is disposed centrally of a stripe of glue repellant material to prevent adhesion between said body plies adjacent said tear string and said line of opening in the inner ply.

13. A tear string container having a laminated tubular body comprising a main ply and an outermost ply wrapped around said main ply and having its adjacent lateral edges overlapped, said main ply having a perforation extending radially therethrough at a point spaced axially from one end of said body, and a tear string secured against the inner surface of said main ply along a line extending helically from said opening toward the opposite end of said main ply and having a free end extending radially outwardly through said perforation in said main ply and thence peripherally between and outwardly from said overlapped edges of the outermost ply, whereby, when said free end of the tear string is pulled, said outermost ply is ripped back to said perforation and then said main and outermost plies are ripped through simultaneously by the string along a line extending from said perforation helically, following the course of said string on the inner surface of said main layer.

14. The container of claim 13 wherein said main and outermost plies are spirally wound with the lateral edges of said main ply offset relative to said helically disposed string.

References Cited in the file of this patent

UNITED STATES PATENTS

| | | |
|---|---|---|
| 1,936,417 | Ware | Nov. 21, 1933 |
| 2,793,127 | Geist et al. | May 21, 1957 |
| 2,795,366 | Magill | June 11, 1957 |
| 2,820,587 | Gold et al. | Jan. 21, 1958 |
| 2,852,179 | Bieler | Sept. 16, 1958 |
| 2,904,240 | Southwell et al. | Sept. 15, 1959 |